United States Patent
Hasegawa et al.

(10) Patent No.: US 8,557,327 B2
(45) Date of Patent: Oct. 15, 2013

(54) METHOD FOR MANUFACTURING GAS DIFFUSION LAYER FOR FUEL CELL

(75) Inventors: Takuya Hasegawa, Yokohama (JP); Norihisa Waki, Yokohama (JP); Hiroshi Kuwahara, Toyonaka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/390,810

(22) PCT Filed: Sep. 3, 2010

(86) PCT No.: PCT/JP2010/065129
§ 371 (c)(1),
(2), (4) Date: Feb. 16, 2012

(87) PCT Pub. No.: WO2011/030720
PCT Pub. Date: Mar. 17, 2011

(65) Prior Publication Data
US 2012/0148732 A1    Jun. 14, 2012

(30) Foreign Application Priority Data
Sep. 10, 2009    (JP) ................. 2009-209734

(51) Int. Cl.
*B05D 5/12*    (2006.01)
*B05D 3/12*    (2006.01)
*B05D 1/28*    (2006.01)

(52) U.S. Cl.
USPC . 427/115; 427/359; 427/458.01; 427/428.06; 427/428.2

(58) Field of Classification Search
USPC ............ 427/115, 428.01, 428.06, 428.2, 359
See application file for complete search history.

(56) References Cited

U.S. PATENT DOCUMENTS

| | | | |
|---|---|---|---|
| 5,688,523 A * | 11/1997 | Garbe et al. ................. 424/448 |
| 6,746,793 B1 | 6/2004 | Gyoten et al. | |
| 7,285,354 B2 * | 10/2007 | Ueyama et al. ............... 429/535 |
| 7,560,180 B2 * | 7/2009 | Yoshida et al. ............... 429/492 |
| 7,857,935 B2 | 12/2010 | Shimoda et al. | |
| 2007/0286948 A1 | 12/2007 | Shimoda et al. | |
| 2008/0223516 A1 | 9/2008 | Tanuma | |
| 2009/0011308 A1 * | 1/2009 | Lee et al. ........................ 429/27 |
| 2010/0314038 A1 | 12/2010 | Tanuma | |
| 2012/0100411 A1 * | 4/2012 | Umehara ..................... 429/144 |

FOREIGN PATENT DOCUMENTS

| | | |
|---|---|---|
| CA | 829253 * | 2/1968 |
| JP | 2000-123842 A | 4/2000 |
| JP | 3444530 B2 | 9/2003 |
| JP | 2008-16431 A | 1/2008 |
| JP | 2009-37953 A | 2/2009 |
| WO | WO 2007-052650 A1 | 5/2007 |
| WO | WO 2009-104701 A1 | 8/2009 |

* cited by examiner

*Primary Examiner* — Brian K Talbot
(74) *Attorney, Agent, or Firm* — Foley & Lardner LLP

(57) ABSTRACT

The invention is to provide a gas diffusion layer for fuel cells having excellent adaptability against load change by attaining a good balance between anti-dry-out properties and anti-flooding properties. The gas diffusion layer for fuel cells containing a substrate layer and an conductive fine particle layer is formed by coating a coating liquid for forming the conductive fine particle layer on at least one surface of a substrate for forming the substrate layer using a gravure roll and by a kiss coating. In coating of the coating liquid, a speed difference is generated between a line speed of transferring the substrate and a circumferential speed of the gravure roll, and apparent viscosity [η(Pa·s)] of the coating liquid as determined by type B viscosimeter satisfies the following relations:

$1.0 < \eta < 200.0$ (3 rpm)

$0.2 < \eta < 10.0$ (30 rpm).

8 Claims, 4 Drawing Sheets

METHOD FOR MANUFACTURING GAS DIFFUSION LAYER FOR FUEL CELL

TECHNICAL FIELD

The present invention relates to a method for manufacturing a gas diffusion layer for fuel cells, a gas diffusion layer for fuel cells, and a fuel cell.

BACKGROUND

A fuel cell is a power generation device for taking out electrical energy by electrochemically oxidizing fuel such as hydrogen and methanol. The fuel cell has been attracting attentions of the world these days as a clean energy source. The fuel cell can be classified depending on the type of the electrolyte into a phosphoric-acid type, a fused carbonate type, a solid oxide type, a solid polyelectrolyte type, etc. Of these, the polymer electrolyte fuel cell is a type of fuel cell that generates electricity by supply hydrogen on one side and oxygen on the other side of a membrane electrode assembly having electrodes arranged on both sides of an electrolyte membrane. As the polymer electrolyte fuel cell can generate a power density equivalent to that of an internal combustion engine, it has been widely researched in order to achieve its practical application as a power source for electric vehicles.

In a polymer electrolyte fuel cell, a unit cell generally is formed by sandwiching a solid polymer electrolyte membrane with a hydrogen side electrode and an oxide side electrode. A plurality of such unit cells are laminated via a separator, to form a fuel cell stack. A gas diffusion layer, which is a porous member with electric conductivity, is generally provided between the electrode and the separator. The gas diffusion layer serves to stably transfer hydrogen, oxygen, water, electron, heat, etc., between an electrode layer and an external circuitry.

Dry-out or flooding can be a cause of making operation of a fuel cell instable. The dry-out means a malfunction of a fuel cell wherein electrical resistance of electrolyte membrane increases under dry conditions of a fuel cell to induce instability of the fuel cell. The flooding means a malfunction of a fuel cell wherein gas passage is blocked due to liquid water generated under moistness conditions of a fuel cell to induce instability of the fuel cell.

As a means of improving anti-flooding properties, a gas diffusion layer has been known which is produced by coating its surface with a porous conductive fine particle layer comprising carbon and polytetrafuluoroethylene attached to the carbon (refer to Patent Document 1).

PRIOR ART DOCUMENTS

Patent Document

Patent Document 1: JP Patent No. 3444530

SUMMARY OF THE INVENTION

Problems to be Solved by the Invention

Although the conductive fine particle layer was originally proposed as a means of reducing contact resistance between a gas diffusion layer and an electrode catalyst layer, it is now considered that it promotes discharge of liquid water generated in the electrode catalyst layer due to the features of the porous structure of the conductive fine particle layer, to suppress the flooding.

Discharge of liquid water can be controlled to some extent by the characteristics of a substrate layer and a conductive fine particle layer of the gas diffusion layer. However, the formation of the conductive fine particle layer makes it difficult to remove reaction heat of the electrode catalyst, to induce dry of the electrode catalyst layer to generate "dry out". In other words, a trade-off relation generally exists that a fuel cell with excellent anti-dry-out properties has poor anti-flooding properties, while a fuel cell with excellent anti-flooding properties has poor anti-dry-out properties. In order to improve performance of a fuel cell, it is necessary to seek a means of attaining both anti-dry-out properties and anti-flooding properties by departing from the trade-off relation mentioned above. By attain a good balance between anti-dry-out properties and anti-flooding properties, a fuel cell can be suitably responded to load changes.

Thus, the present invention has an object to provide a method for manufacturing a gas diffusion layer for fuel cells having excellent adaptability against load change by attaining a good balance between anti-dry-out properties and anti-flooding properties, and to provide a gas diffusion layer for fuel cells having excellent adaptability against load change by attaining a good balance between anti-dry-out properties and anti-flooding properties, thus providing a fuel cell having excellent adaptability against load change.

Means for Solving Problems

The present inventors have made an extensive research aiming to solve the problems, to find that a gas diffusion layer for fuel cells having excellent adaptability against load change can be provided by a specific means of forming a conductive fine particle layer on the gas diffusion layer by coating.

To be specific, the method for manufacturing a gas diffusion layer for fuel cells according to the invention to achieve the object mentioned above is a method for manufacturing a gas diffusion layer for fuel cells containing a substrate layer and a conductive fine particle layer, which method comprises a coating step of applying a coating liquid for forming said conductive fine particle layer on at least one surface of a substrate for forming said substrate layer by a kiss coating using a gravure roll.

Effects of the Invention

In the method for manufacturing a gas diffusion layer for fuel cells according to the present invention, a gas diffusion layer for fuel cells having excellent adaptability against load change can be produced by determining conditions for coating a coating liquid for forming a conductive fine particle layer on a surface of a substrate for forming a substrate layer to improve anti-flooding properties while maintaining anti-dry-out properties and to ensure a good balance between anti-dry-out properties and anti-flooding properties.

The gas diffusion layer for fuel cells according to the present invention has excellent adaptability against load change by determining conditions for coating a coating liquid for forming a conductive fine particle layer on a surface of a substrate for forming a substrate layer to improve anti-flooding properties while maintaining anti-dry-out properties and to ensure a good balance between anti-dry-out properties and anti-flooding properties.

Further, by applying the gas diffusion layer for fuel cells, a fuel cell with excellent adaptability against load change can be provided.

BRIEF DESCRIPTION OF DRAWING(S)

FIG. 1 is a cross-section showing critical parts of a polymer electrolyte fuel cell.

FIGS. 2 (A) and (B) are a schematic diagram showing a coating device for coating a coating liquid.

MODE FOR CARRYING OUT THE INVENTION

Figure 1:
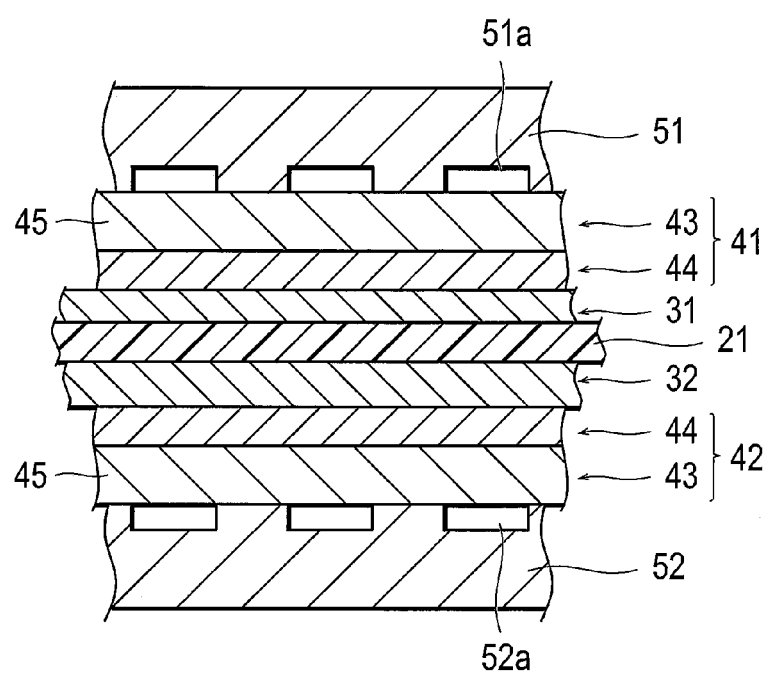

Embodiments of the present invention will be described below with reference to the accompanying drawings. In the drawings, identical elements will be identified by identical codes in order to avoid duplicating descriptions. The scaling factors of the drawings may vary from those of actual components because of intentional exaggerations for the sake of explanations.

With reference to FIG. 1, a polymer electrolyte fuel cell 10 has, as well-known in the field, an anode catalyst layer 31 and a cathode catalyst layer 32 opposing each other on the opposing surfaces of a solid polymer electrolyte membrane 21, an anode gas diffusion layer 41 between the anode catalyst layer 31 and an anode separator 51, and a cathode gas diffusion layer 42 between the cathode catalyst layer 32 and a cathode separator 52. A fuel gas is supplied via a supply grove 51a provided on the anode separator 51. An oxidizing gas is supplied via a supply grove 52a provided on the cathode separator 52. In the following, each element of the fuel cell will be described in detail.

(Gas Diffusion Layers 41, 42)

The gas diffusion layers 41 and 42 serves to supply a fuel gas and an oxidizing gas supplied to the fuel cell 10 to the catalyst layers 31 and 32 respectively, and serves to transfer electrons between the catalyst layers 31 and 32 and the separators 51 and 52. The gas diffusion layers 41 and 42 in the present embodiment, which comprises a substrate layer 43 and a conductive fine particle layer 44, can efficiently discharge generated water by excellent water-repellent properties and its gradient.

(Substrate Layer 43)

The substrate layer 43 can be any substrate, so long as it has a porous structure for diffusing sufficient amounts of a fuel gas or an oxidizing gas supplied from outside and has sufficient electrically-conductive property to collect electrons generated by power generating reaction.

The material of a substrate 45 that constitutes the substrate layer 43 is not limited, and can be an arbitrary known material of prior art. Specifically, a sheet-like material having electrically-conductive property and porosity, e.g., a fabric made of carbon, a paper-like material, felt, or an unwoven fabric, can be included. Use of a porous sheet-like material can cause a gas supplied from outside to be diffused evenly within the substrate layer 43. More specifically, carbon paper, carbon cloth, and carbon unwoven fabrics can be used as the substrate 45. Use of the substrate layer 43 with excellent electrical conductivity can efficiently transport electrons generated by power generating reaction and improve performance of the fuel cell 10.

It is also preferable to have a water-repellent agent included in the substrate layer 43 in order to achieve a high water-repellent property. The water-repellent agents that can be used here include, but not limited to, fluorine polymer materials such as polytetrafluoroethylene (PTFE), polyfluorovinylidene (PVDF), polyhexafluoropropylene, and tetrafluoroethylene-hexafluoropropylene copolymer (FEP), polypropylene, polyethylene, etc.

While the thickness of the substrate layer 43 can be arbitrarily determined considering the characteristics of the gas dispersion layers 41 and 42, it can be approximately 30-500 µm. If the thickness of the substrate 45 is held within such a range, an appropriate balance between mechanical strength and permeability of gas and water can be achieved.

The air permeability (Gurley permeability) of the substrate layer 43 can be preferably 0.05 second or higher, more preferably 0.06 second or higher, further preferably 0.07 second or higher, further more preferably 0.08 second or higher, and most preferably 0.1 second or higher. The air permeability of the substrate layer 43 can be preferably 1 second or lower, more preferably 0.8 second or lower, further preferably 0.7 second or lower, further more preferably 0.6 second or lower, and most preferably 0.5 second or lower. Within the range indicated above, the coating liquid of conductive fine particle layer 44 would not pass through to the back, and excellent gas diffusion properties can be secured. As used herein, "air permeability (Gurley permeability)" means a value measured according to JIS P8117: 1998.

The air permeability (Gurley permeability) of the gas diffusion layers 41 and 42 can be preferably 1 second or higher, more preferably 2 seconds or higher, further preferably 5 seconds or higher, further more preferably 10 seconds or higher, much more preferably 20 seconds or higher, and most preferably 30 seconds or higher. The air permeability of the gas diffusion layers 41 and 42 can be preferably 100 seconds or lower, more preferably 80 seconds or lower, further preferably 70 seconds or lower, much more preferably 60 seconds or lower, and most preferably 50 seconds or lower. Within the range indicated above, the conductive fine particle layer 44 can sufficiently cover the substrate layer 43, and excellent gas diffusion properties can be secured.

(Conductive Fine Particle Layer 44)

The conductive fine particle layer 44 preferably contains conductive fine particles and a binder. As electrons generated by electrode reaction passes through the layer, high electrical conductivity can be conferred to the conductive fine particle layer 44 by using conductive fine particles. Moreover, a robust hole structure can be formed and maintained by incorporating the binder.

The conductive fine particles serve to transfer electrons generated by electrode reaction to the substrate layer 43. The conductive fine particles are preferably those that are chemically stable at positive electrode potentials and negative electrode potentials. The anode gas diffusion layer 41 preferably comprises carbon particles, Ag particles, Au particles, Cu particles, Ti particles, or SUS (stainless steel) particles. The cathode gas diffusion layer 42 comprises carbon particles, Al metallic particles, or SUS (stainless steel) particles. Carbon particles are especially preferably used in the anode side and/or cathode side gas diffusion layers 41 and 42. The carbon particles have a wide potential window and are stable either in positive potentials and negative potentials, and in addition, they have excellent electrical conductivity. The conductive fine particles can be used singly or in a mixture of two or more members.

Carbon particles can be of any kind, so long as they have an excellent electrical conductivity. Carbon black, graphite, and expanded graphite may be cited. Amongst them, carbon blacks such as oil-furnace black, channel black, lamp black, thermal black, acetylene black are favored due to their superior electron conductivity and large specific surface areas.

The size of conductive fine particle is not especially limited. The average particle diameter (mean primary particle diameter) can be preferably 10-100 nm. The average particle diameter (mean primary particle diameter) as used herein means a crystal diameter determined by a half-value width of diffraction peak of conductive fine particles in X-ray diffraction.

The binder serves to bind the conductive fine particles. The binder can be fluorine polymer materials such as polytetrafluoroethylene (PTFE), polyfluorovinylidene (PVDF), polyhexafluoropropylene, and tetrafluoroethylene-hexafluoropropylene copolymer (FEP), polypropylene, polyethylene, etc. Amongst them, fluorine polymer materials, in particular, polytetrafluoroethylene (PTFE), are preferably used, because of their excellent water-repellent and corrosion resistant characteristics during electrode reaction. The shape of the binder be either shape such as in a particle form, a fine particle form, or an amorphous form.

The lower limit of the content of the binder in the conductive fine particle layer 44 would be preferably 10% by mass or more, more preferably 15% by mass or more, further preferably 20% by mass or more, further more preferably 25% by mass or more, and most preferably 30% by mass or more, of the total mass of the conductive fine particle layer 44. If the content is less than 10% by mass, the bondage between the conductive fine particles would be too weak which is not preferable. The upper limit of the content of the binder in the conductive fine particle layer 44 would be preferably 60% by mass or less, more preferably 55% by mass or less, further preferably 50% by mass or less, further more preferably 45% by mass or less, and most preferably 40% by mass or less, of the total mass of the conductive fine particle layer 44. If the content exceeds 60% by mass, holes would get clogged up by the binder to lower gas diffusion properties, which is not preferable. It would also not preferable because an excess amount of the binder would cause increase in electrical resistance.

The lower limit of the weight per unit area of the conductive fine particle layer 44 (weight of the gas diffusion layers 41 and 42 per square meter) would be preferably 10 g or more, more preferably 15 g or more, and further preferably 20 g or more. The upper limit of the weight per unit area of the conductive fine particle layer 44 would be preferably 100 g or less, more preferably 75 g or less, further preferably 50 g or less, and further more preferably 40 g or less.

(Method for Manufacturing Gas Diffusion Layers 41, 42)

The method for manufacturing the gas diffusion layers 41 and 42 comprises a step of preparing a coating liquid for forming the conductive fine particle layer 44 (first step); a step of applying the coating liquid onto the surface of a substrate 45 for forming a substrate layer 43 using a gravure roll, coating a transfer area which applies the coating liquid on the substrate 45 by kiss coating, especially kiss coating without backup roll (second step); and a step of heat-treating the substrate 45 coated with the conductive fine particle layer 44 (third step).

Figure 2A:
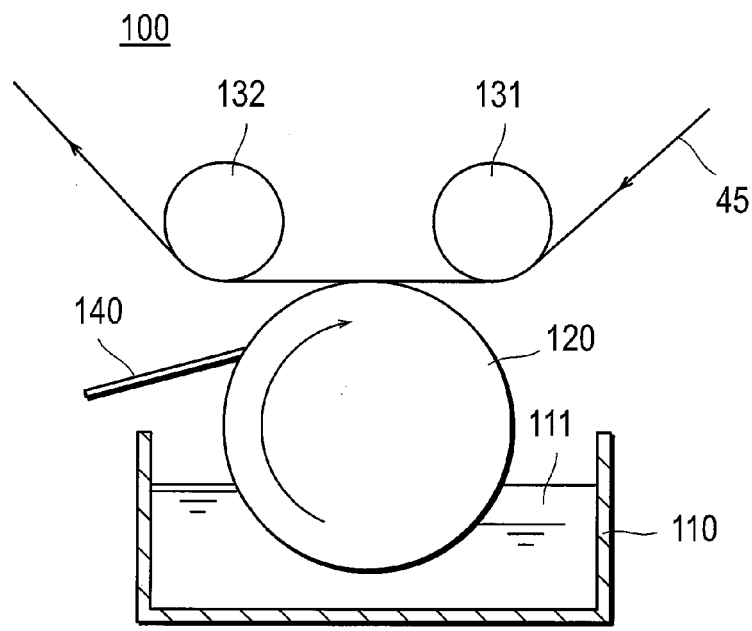
Figure 2B:
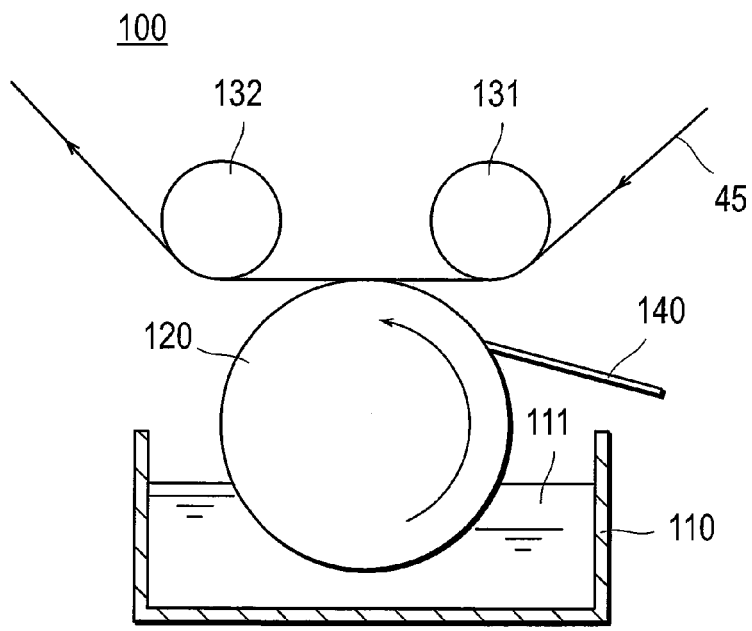

A preferable embodiment of the present invention will be described below with reference to FIGS. 2(A) and 2(B). In FIGS. 2(A) and 2(B), a coating device 100 uses, as its coating, kiss coating without backup rolls (or impression cylinder rolls, backing rolls, nip rolls) at the transfer area between a substrate 45 and a coating liquid 111. The coating device 100 has a tank 110 for pooling the coating liquid 111, a gravure roll 120 rotatably placed above the tank 110, a pair of pressure rolls 131 and 132 placed at the opposite side of the gravure roll 120 relative to the substrate 45 to be conveyed, and a doctor blade 140 contacting the outer periphery of the gravure roll 120. The pressuring rolls 131 and 132 are also called as hold-down rolls, guide rolls, or extension rolls. In FIG. 2(A), the gravure roll 120 rotates clockwise, while in FIG. 2(B), the gravure roll 120 rotates counterclockwise. The substrate 45 is conveyed leftward in the drawings in both FIGS. 2(A) and 2(B). The pressure rolls 131 and 132 are located above the gravure roll 120 and on the upstream side and the downstream side respectively of the gravure roll 120 along the conveying direction of the substrate 45. The substrate 45 as a whole would be contacting with the gravure roll 120 by an extension force. The substrate 45 contacts with the gravure roll 120 after passing the pressure roll 131 and then moves further passing the pressure roll 132. The part where the substrate 45 contacts with the gravure roll 120 is the transfer area between the substrate 45 and the coating liquid 111. The doctor blade 140 is located upstream of the transfer area relative to the rotating direction of the gravure roll 120. The doctor blade 140 scrapes off an excessive amount of the coating liquid 111 from the outer periphery of the gravure roll 120. The kiss coating can be accomplished also by arranging the impression cylinder rolls in a similar manner as the pressure rolls 131 and 132.

(First Step: Preparation of Coating Liquid 111)

The main ingredients of the coating liquid 111 (slurry) for forming the conductive fine particle layer 44 are conductive fine particles, a binder and a solvent, but another additive such as a surfactant can be added. The coating liquid 111 (i.e., gas diffusion layers 41 and 42) preferably does not contain any catalyst component such as precious metal, especially platinum. Consequently, the coating liquid 111 preferably consists of conductive fine particles (more preferably carbon particles), a binder, a surfactant, and a solvent. While the solvent is not specifically limited, various solvents such as water, lower alcohols such as methanol, ethanol, and isopropanol, acetone, methylethylketone (MEK), and the like can be used. While the surfactant is also not specifically limited, various non-ionic surfactants such as polyoxyethylene-p-t-octylphenol (oxyethylene number=9, 10), [(polyoxyethylene-p-t-octylphenol; TritonX-100)], polyoxyethylene lauryl ether, polyoxyethylene cetyl ether, polyoxyethylene oleyl ether, polyoxyethylene stearyl ether, isostearic acid polyoxyethylene glyceryls such as isostearic acid PEG-5 glyceryl, isostearic acid PEG-15 glyceryl, isostearic acid PEG-20 glyceryl, and isostearic acid PEG-30 glyceryl, tri-isostearic acid polyoxyethelene glyceryls such as tri-isostearic acid PEG-10 glyceryl, tri-isostearic acid PEG-20 glyceryl, and tri-isostearic acid PEG-20 glyceryl, can be used.

The following is an example of a preferable method for preparing the coating liquid 111 using carbon particles such as carbon black as the conductive fine particles. The method comprises sequential steps: 1) a pre-dispersion (premixing) step for wetting the carbon particles (carbon black) with the surfactant in the solvent to blend them; 2) a dispersion step for preparing carbon ink by fully stirring carbon black; and 3) a dispersion step of adding the binder and fully stirring the mixture.

A simple dispersion machine such as a propeller type stirrer, a homogenizer, and a homo-mixer can be used as a dispersion machine for preparing the coating liquid 111. The preferable rotating speeds of the machine during the stirring in each step are: 1-300 rpm, more preferably 80-200 rpm in the step 1), 80-5000 rpm, more preferably 80-200 rpm in the step 2), 1-300 rpm, more preferably 80-200 rpm in the step 3). The rotating speed of the stirring can be adjusted within 1-5000 rpm, preferably 80-5000 rpm, or set to a fixed speed for all steps, depending on the coating liquid 111 state and the dispersion time. The stir/dispersion time for each step would preferably be 1 minute to 4 hours, preferably 1-2 hours.

The steps 1) and 2) can be executed as one continuous step. Although the conditions in the steps 1) and 2) are not specifically limited, it is preferable that the dispersion is done by stirring at a lower speed (under a low shearing condition). In other words, the coating liquid would preferably be prepared by stirring carbon particles as the conductive fine particle, a surfactant, and a solvent at a low rotating speed, and then adding a binder to the resultant mixture. More specifically, the carbon particles, the surfactant, and the solvent are stirred to mix for 1 minute to 4 hours at a low rotating speed (low shearing condition) of 80-200 rpm using a propeller type stirrer, and the binder is added thereto, to prepare the coating liquid.

In the above process 3), a solvent can be added in addition to a binder. The addition can easily adjust apparent viscosity [Pa·s] and a solid content (concentration) of conductive fine particle a [wt %] within an appropriate range. The solvent is not limited specifically and the same solvents indicated above can be used. Although the solvent used in the step 1) can be the same as or different from the solvent used in the step 3), it is preferable to use the same solvent for both steps considering easy operations in the manufacturing steps.

The coating liquid 111 during the dispersion step would preferably be stirred with maintaining a high concentration (high conductive fine particle concentration) and a high viscosity. When an ink with a low concentration or a low viscosity is applied, the ink (coating liquid) may easily seep out onto a surface different from the coating surface of the substrate 45, and would make it difficult to form a smooth and dense conductive fine particle layer 44. Alternatively, it may cause a deeply penetrating dispersion of the ink into the substrate 45, thus making it difficult to attain desired water-repellent property and desired anti-flooding properties. Therefore, it is preferably to use an ink having a high concentration (high conductive fine particle concentration) and a high viscosity as the coating liquid.

While the coating liquid 111 prepared in a paste-like state may be highly viscous, contain a large amount of bubbles and lacks fluidity, its properties may be affected by the characteristics of the coating device 100 to be described later. As such, it may be preferable to apply a foam removing step, but it is not necessary to do so.

The coating fluid 111 used in the coating device 100 is a thixotropic liquid, and the apparent viscosity η [Pa·s] at 25° C. as measured by Type B viscosimeter is:

$$1.0 < \eta < 200.0 \ (3 \ \text{rpm})$$

$$0.2 < \eta < 10.0 \ (30 \ \text{rpm}),$$

preferably $$2.0 \le \eta \le 100.0 \ (3 \ \text{rpm})$$

$$0.3 \le \eta \le 9.0 \ (30 \ \text{rpm}),$$

more preferably $$3.0 < \eta < 40.0 \ (3 \ \text{rpm})$$

$$0.5 < \eta < 8.0 \ (30 \ \text{rpm}),$$

and most preferably $$6.0 \le \eta \le 25.0 \ (3 \ \text{rpm})$$

$$1.4 \le \eta \le 6.0 \ (30 \ \text{rpm}).$$

Moreover, the concentration of the coating liquid 111 in which the conductive fine particles are dispersed, i.e., the solid content (concentration) α [wt %] is preferably:

$$10 \le \alpha \le 90,$$

more preferably $$12 \le \alpha \le 60,$$

and most preferably $$13 < \alpha < 40$$

Unless the viscosity and the solid content become smaller than the ranges shown above, it would neither cause a phenomenon of the coating liquid 111 seeping out to make the formation of dense coating of the conductive fine particle layer 44 difficult, nor any reduction of water-repellent property, and a conductive fine particle layer 44 with excellent anti-flooding properties can be produced.

Furthermore, unless the solid content grows greater than the ranges shown above, the gravure roll 120 can pick up the coating liquid 111 in the coating step, to bring a favorable result.

The coating amount (coating amount of the conductive fine particles) γ [g/m²] of the coating liquid 111 necessary for producing the gas diffusion layers 41 and 42 can be adjusted depending on the nature of the substrate 45, and it is preferably:

$$5 \le \gamma \le 100,$$

more preferably $$10 \le \gamma \le 50,$$

and further preferably $$18 \le \gamma \le 30.$$

Unless the coating amount of the coating liquid 111 becomes smaller than the ranges shown above (γ becomes less than 5 g/m²), no shortage of coating on the substrate layer 43 would occur and the substrate layer 43 is protected from exposure.

Moreover, unless the coating amount of the coating liquid 111 becomes larger than the ranges shown above (γ becomes more than 100 g/m²), neither the cost of the conductive fine particle would increase, nor the performances of the gas diffusion layers 41 and 42 would deteriorate due to an excessive thickness of the conductive fine particle layer.

(Second Step: Coating with Gravure Roll 120)

The step is to apply the coating liquid prepared in the first step onto at least one surface of the substrate using a gravure roll, and coating a transfer area which applies the coating liquid on the substrate by a kiss coating. In this case, the coating liquid can be applied onto at least one surface of the substrate on catalyst layer 31 and 32 sides and separator 51 and 52 sides. The coating liquid is preferably applied onto the surface of the catalyst layer 31 and 32 sides of the substrate as shown in FIG. 1.

A coating device 100 shown in FIGS. 2(A) and (B) is a means of coating a fixed amount (defined application type-coating), which is called a kiss gravure coater. Since this type of coating means is a type wherein a specific coating amount is taken before a coating liquid 111 is transferred to a substrate 45, a coating thickness can be made uniform and at the same time, can cause a speed difference between a roll and a line to confer smoothness to the coated surface.

By using a device 100 of a kiss coating type, a pressure applied to a contact surface where a coating liquid 111 is transferred to a substrate 45 is only an extension force applied by pressure rolls 131, 132. Consequently, a load on a substrate 45 arising from shearing and friction with a gravure roll 120 can be decreased when a backup roll is used. By this, scratching on a coating surface and damage on a substrate 45 that is easily occurred can be reduced or prevented. As a result, productivity of smooth conductive fine particle layer 44 can be increased and quality of gas diffusion layers 41, 42 can be improved. Since a surface of the conductive fine particle layer 44 immediately after being transferred excels in smoothness, contact resistance of gas diffusion layers 41, 42 relative to battery performance can be reduced. Further, a pore structure and a pore distribution within the conductive fine particle layer 44 can be easily controlled, to suppress flooding phenomenon to an appropriate level.

In the manufacturing method of gas diffusion layers 41, 42 of the present embodiment, an absolute value of circumferential speed GR [m/min] of the gravure roll 120 is preferably higher than an absolute value of line speed LS [m/min] of conveying the substrate 45 in view of smooth coating of the conductive fine particle layer 44.

A ratio of the circumferential speed GR [m/min] of gravure roll 120 relative to the line speed LS [m/min] would preferably be in the range of:

$-1 < LS/GR < 1$ (except that $LS/GR \neq 0$)

more preferably $-0.8 < LS/GR < 0.8$ (except that $LS/GR \neq 0$)

further preferably $-0.5 < LS/GR < 0.5$ (except that $LS/GR \neq 0$)

furthermore preferably $-0.3 < LS/GR < 0.3$ (except that $LS/GR \neq 0$)

and most preferably $-0.2 \leq LS/GR \leq 0.2$ (except that $LS/GR \neq 0$)

A negative value of LS/GR represents a fact that a gravure role 120 is rotating in the opposite (reverse) direction relative to the direction of conveying the substrate 45, and a positive value of LS/GR represents a fact that a gravure role 120 is rotating in the forward direction relative to the direction of conveying the substrate 45. In general, a coater of reverse rotation coating is called a kiss reverse gravure (or reverse kiss gravure) coater (FIGS. 2(A)), and a coater of forward rotation is called a kiss gravure coater (FIG. 2(B)). Among these, a kiss reverse gravure (or reverse kiss gravure) wherein a gravure role is rotating in the opposite (reverse) direction relative to the direction of conveying a substrate is preferably used as a coating method in view of easy manufacturing step. When a kiss reverse gravure (or reverse kiss gravure) is used, a coating amount of coating liquid (especially conductive fine particles) can be easily secured for the same LS/GR ratio, as compared to the case of kiss gravure.

Mainly two actions simultaneously occur when the speed ratio LS/GR is fallen within the ranges shown above. Since a coating liquid 111 to be prepared to have a high viscosity (concentration) in order to suppress seeping, i.e., a coating liquid 111 with a poor leveling property, and a porous substrate 43 having poor smoothness are used in the present embodiment, an amount required for coating increases as compared with the case where such a coating liquid and such a substrate are not used. Therefore, if the speed ratio is kept within the ranges shown above, an amount of coating liquid 111 necessary for laminating a conductive fine particle layer 44 on a surface of substrate 43 can be selected and a sufficient amount can be secured. Another action is that only a top surface of conductive fine particle layer 44 in which a shearing force is generated by the speed ratio LS/GR can be smoothened by leveling or smoothing. Even if the coating liquid 111 contains a lot of bubbles and has poor leveling property due to its high viscosity, bubbles on the surface of the coating liquid 111 can be completely scraped away and also undulations of the gravure plate can be removed (leveling and smoothing effects) by shearing force caused by convex-concaves of gravure roll 120 and roll rotation at the same time of transfer of the coating liquid 111. This makes it possible to obtain an conductive fine particle layer 44 with a smooth coating surface and uniform thickness.

As the absolute value of speed ratio LS/GR decreases to 0, a coating amount of coating liquid 111 tends to increase, and smoothness of the surface of conductive fine particle layer 44 tends to improve, to set an optimum speed ratio LS/GR depending on gas diffusion layers 41, 42 having a preferable performance in terms of pore structure and pore distribution.

If the speed ratio LS/GR deviates from the ranges mentioned above (Ls/G is lower than −1, or LS/GR is higher than 1), smoothing action by shearing force of speed ratio LS/GR would not function well to induce transfer of gravure plate pattern and bubbles of coating liquid 111 and to create engraving-like patterns, because LS and GR are moving at the same speed to each other if LS/GR=1. In the case of speed ratio LS/GR other than this case, since a sufficient amount of coating liquid 1111 to laminate a conductive fine particle layer 44 would not be taken, deficiency or failure such as omission or shortage of coating material results, making it impossible to achieve a smooth conductive fine particle layer 44. Although it is a condition preferred in general for leveling engravings of a plate with unevenness used in offset gravure or direct gravure printing, a thin coating as of not more than 10 μm using a coating material with low viscosity (viscosity $\eta < 1$ Pa·s) and high leveling capability (i.e., smoothly spreadable) and a substrate of excellent smoothness is aimed at, which may not be always suitable for the present embodiment.

Although a preferable range of line speed LS varies with a coating device 100, it is typically 0.5-200 m/min. If the line speed LS is, for example, 0.5 m/min, a circumferential speed GR of gravure roll 120 is larger than 0.5 m/min, or more preferably 1.0 m/min. If the line speed LS is, for example, 200 m/min, a circumferential speed GR of gravure roll 120 is larger than 200 m/min, or more preferably 400 m/min. If the line speed LS is outside of the range of 0.5-200 m/min, productivity of product may be affected, design of coating device 100 may become difficult, or it may be difficult to supply a conductive fine particle layer 44 with a stable performance and quality.

There is no particular restriction as to other operating conditions, for example, tension and central angle between contact points of gravure role 120 and substrate 45. It is preferable to select the operating condition to suit the coating liquid 111 and operating conditions to suit design of conductive fine particle layer 44.

There is no restriction to use other gravure devices based on kiss coating in addition to the coating device 100 described above. For example, a twin roll coater and an air doctor coater can be used as the coating device to form a smooth surface of the conductive fine particle layer 44 so long as they can be a gravure device based on kiss coating by modifying their types of rolls and arrangements.

There is no particular restriction as to the stepping shape, cup shape, and mesh number of gravure roll 120. The cup shape of gravure cell can be a grid (trapezoid) shape cup, a pyramid shape cup, a hexagonal cup, a triangular oblique line shape cup, a trapezoidal oblique line cup, etc. A coating amount can be adjusted by mesh number and depth (μm).

The mesh number represents the number of divisions per an arbitrary unit area (square inch) of roll surface, or divisions per unit length (inch) in an arbitrary direction. The mesh number is preferably 10-400 and the depth is preferably 400-5 µm. In general, the smaller the mesh number is, the larger the depth tends to be, to increase a coating amount.

There is also no restriction to engraving pattern of gravure roll 120. While a gravure process essentially originates in printing technology, there is no specific restriction as to engraving pattern so long as a coating should produce a smooth surface on conductive fine particle layer 44 and its coating thickness should be constant. For example, a complex engraving pattern such as an Euclidean geometric pattern or a fractal geometric pattern can be used. It is preferable to select a roll type to suit a coating liquid 111 and a roll type to suit design of conductive fine particle layers 41, 42.

An outer diameter of gravure roll 120 would be 20 mm or larger, preferably 50 mm or larger, more preferably 60 mm or larger, and most preferably 120 mm or larger. Although an upper limit of diameter of gravure roll 120 is not specified, it is preferably 500 mm or less, more preferably 250 mm or less, and most preferably 200 mm or less. The outer diameter of the gravure roll 120 less than 20 mm would not be preferable, as a rotating speed required to achieve necessary circumferential speed GR would become too high to cause problems such as scattering of coating liquid 111 and impossible formation of conductive fine particle layer 44 with sufficient smoothness. A gravure roll 120 having a roll diameter of 20-50 mm is sometimes called "Micro Gravure (registered trademark)". The "Micro Gravure (registered trademark)" is mainly used for forming a thin film coat with a thickness of 10 µm or less (approximately 10 g/m$^2$ or less in coating amount), or more preferably 2-3 µm or less (approximately 2-3 g/m$^2$ in coating amount) using a coating liquid 111 with a low viscosity as of less than 1.0 Pa·s or less, which may not be a suitable case for the present embodiment in some cases. A width of gravure roll 120 is preferably 200-2000 mm.

As shown in FIGS. 2(A) and (B), a doctor blade 140 can be installed on a gravure roll 120 to scrape off a coating liquid 111 attached to a surface before it is applied to a substrate 45. There is no particular restriction as to condition or location of installation so long as it is within the range that does not affect the purpose of the invention. A material of doctor blade can be Swedish steel or ceramics, and its typical thickness may be either 100 µm, 150 µm, or 200 µm, but there is no particular restriction. There is also particular restriction as to setting conditions of doctor blade 140, e.g., a contact angle of blade tip. A metering roll can be used in place of doctor blade 140 depending on stepping shapes of gravure roll 120.

Although a paint pan of an open-type or closed-type can be used in a supply system of coating liquid 111, there is no particular restriction. However, such a supply system capable of continuously supplying a coating liquid 111 is more preferable as compared to that of batch type and semi-batch type, as the coating liquid is desirably stirred or circulated constantly. A supply system equipped with a gravure roll 120 of extrusion (die) type, lip, fountain, etc can also be used.

(Third Step: Heat Treatment)

In the third step, a substrate 45 coated with a conductive fine particle layer 44 is heat-treated to be sintered, and water-repellent (binder) particles are thermally fused with carbon black particles to stabilize a conductive fine particle layer 44.

The substrate 45 coated with conductive fine particle layer 44 is placed and dried in a drying oven kept at a temperature of not less than a room temperature, preferably not less than than 60° C., and more preferably not less than than 100° C. Although there is no restriction to the upper limit of the drying oven's temperature, it is preferable to be not more than than 350° C., and more preferably not more than 200° C., considering a structure and performance stability of a substrate layer and a conductive fine particle layer. Moreover, there is no particular restriction as to drying time of substrate 45 coated with conductive fine particle layer 44 inside a drying furnace and it can be arbitrarily selected depending on coated amount of coating liquid. The drying time would preferably be 1 second to 20 minutes. There is no particular restriction as to drying method and drying can be carried out properly using a general continuous drying furnace attached to a coating machine.

Gas diffusion layers 41, 42 are sintered to cause conductive fine particles and binder to be thermally fused. While a sintering temperature can be arbitrarily selected by a person skilled in the art based on a type of binder, it is preferably not less than 330° C., more preferably not less than 340° C., and further preferably not less than 350° C. in the case of PTFE. Although there is no restriction as to the upper limit of sintering temperature, it is preferable to be not more than 400° C., in view of a structure and performance stability of a substrate layer and a conductive fine particle layer. A sintering time is preferably not shorter than 1 minute, and more preferably not shorter than 10 minutes. Similarly, although there is no restriction to the upper limit of the sintering time, the upper limit would preferably be two hours, in view of a structure and performance stability of a substrate layer and a conductive fine particle layer.

(Membrane Electrode Assembly)

The membrane electrode assembly is a junction body consisting of five layers, i.e., a gas diffusion layer 41, a catalyst layer 31, an electrolyte membrane 21, a catalyst layer 32, and a gas diffusion layer 42, which provides in combination with separators 51, 52, and a supply of oxygen and hydrogen, to constitute a fuel cell 10.

In the membrane electrode assembly, a side equipped with hydrogen side catalyst layer is called anode, while a side equipped with oxygen side catalyst layer is called cathode. A fuel cell consisting of one set of membrane electrode assembly and separators 51, 52 is called a single cell in some cases. In some cases, the membrane electrode assembly is called an MEA (membrane electrode assembly), while gas diffusion layers 41, 42 are called GDL (gas diffusion layers).

Also, in some cases, three layers consisting of a catalyst layer 31, an electrolyte membrane 21, and a catalyst layer 32 is called CCM (catalyst coated membrane), and two layers consisting of a catalyst layer 31 (or 32) and a gas diffusion layer 41 (or 42) is called GDE (gas diffusion electrode). The gas diffusion electrode is in some cases simply called an "electrode."

(Electrolyte Membrane 21)

An electrolyte membrane 21 is a permselective membrane serving to transport protons and insulate electrons. The electrolyte membrane 21 is classified into fluorine type electrolyte membranes and carbohydrate type electrolyte membranes depending on kinds of ion exchange resins as constituent material. Of these, the fluorine type electrolyte membrane excels in heat resistance and chemical stability, because of its C—F bond. For example, perfluorosulfonic acid membrane known by a product name "Nafion" (trade name registered by Dupont) has been widely used.

(Catalyst Layers 31, 32)

A cathode catalyst layer 32 is a layer containing an electrode catalyst having catalyst components supported and ionomer. The electrode catalyst serves to promote reaction that generates water from protons, electrons, and oxygen (oxygen reduction reaction). The electrode catalyst has a structure, for example, having catalytic components such as platinum supported on a surface of conductive carrier made of carbon, etc.

The anode catalyst layer 31 is a layer containing an electrode catalyst having catalyst components supported and ionomer. The electrode catalyst serves to promote reaction of dissociating hydrogen into protons and electrons (hydrogen oxidation reaction). The electrode catalyst has a structure, for example, having catalytic components such as platinum supported on a surface of conductive carrier made of carbon, etc.

(Method for Manufacturing Membrane Electrode Assembly)

A membrane electrode assembly can be manufactured using a conventional method by forming on both sides of a solid polymer electrolyte membrane anode side and cathode side catalyst layers 31, 32 respectively, and sandwiching it with gas diffusion layers 41, 42 obtained by applying the method described above. For example, the membrane electrode assembly can be manufactured by sandwiching catalyst layers 31, 32 formed on a solid polymer electrolyte membrane with a pair of gas diffusion layers 41, 42 and jointing them together. Alternatively, the membrane electrode assembly can be manufactured by forming catalyst layers 31, 32 on one side of gas diffusion layers 41, 42, and sandwiching a solid polymer electrolyte membrane 21 with a pair of gas diffusion layers 41, 42 in such a manner that the catalyst layers 31, 32 face with each other, and jointing them together.

The catalyst layers 31, 32 can be manufactured by applying a catalyst ink comprising electrode catalyst, polyelectrolyte, and a solvent to a solid polymer electrolyte membrane by a conventional method such as spraying method, transfer method, doctor blade method, and dye coater method.

An amount of the catalytic ink to be coated on the solid polymer electrolyte membrane 21 is not particularly restricted so long as it should enable an electrode catalyst to provide a sufficient catalytic action for electrochemical reaction, but a mass of catalyst components per unit area is 0.05-1 mg/cm$^2$. A thickness of catalyst ink to be coated would preferably be 5-30 μm after it is dried. The abovementioned coating amount and thickness of catalyst ink does not need to be equal on the anode side and the cathode side, but rather can be adjusted appropriately.

A thickness of catalyst layers 31, 32, gas diffusion layers 41, 42, and polyelectrolyte membrane 21 of membrane electrode assembly would preferably be thinner from the standpoint of improving fuel gas diffusion, but it would not provide a sufficient electrode output if it is too thin. Therefore, it could be decided appropriately so as to achieve a desired characteristic of membrane electrode assembly.

A fuel cell 10 of the present embodiment is suitable not only as a mobile source such as of a vehicle where an installation space is limit, but also as a stationary source, but it is particularly suitable for automobile use where system startup and stop as well as output fluctuations occur frequently.

EXAMPLES

Example 1

Preparation of Gas Diffusion Layer

Carbon black was used as conductive fine particles, PTFE was used as a water-repellent agent and as a binder for carbon black, and carbon paper was used as a substrate of gas diffusion layer.

(1) Preparation of Coating Liquid (Dispersion of Carbon Black and PTFE)

A 500 mL beaker was charged with 45 g of acetylene black (HS-100, produced by Denki Kagaku Kogyo K.K.; average particle diameter=48 nm) as a conductive fine particle, 3 g of a surfactant (TRITON X-100, produced by Dow Chemical), and 193 g of pure water. The resultant mixture was stirred at a rotating speed of 80-100 rpm for 1-2 hours using a propeller type stirrer (Three-One Motor BL300, produced by HEIDON) equipped with two stirring wings (soft cross). After confirming that the acetylene black and the surfactant became in a paste-like state and sufficiently dispersed therein, 20 g of PTFE dispersion (Polyflon™ PTFE D-1E, produced by Daikin Industries, Ltd; average particle diameter=about 0.23 μm; solid content=60% by mass) and 9 g of pure water were added and the mixture was stirred at a rotating speed of 100 rpm for one hour, to obtain a coating liquid. The viscosities (25° C.) were 18.8 Pa·s (3 rpm) and 2.8 Pa·s (30 rpm).

(2) Coating of Conductive Fine Particle Layer

A carbon paper, TGP-H-060 (thickness: 190 μm, Gurley permeability: 0.10 sec), produced by Toray Industries, Inc., was used as a substrate.

Test Coater (M-200, produced by Hirano Tecseed, Co., Ltd.) was used as a coating device for coating the coating liquid described above. A gravure kiss coating method using a gravure roll and a pressure roll was used for a coating roll. The outline of the coating device is as shown in FIG. 2. The gravure roll had a diameter of 150 mm and a width of 280 mm, and was formed as grid type 60 (mesh)-150 μm (depth). A line speed LS of the substrate was set to be 0.7 m/min and the gravure roll was rotated at a circumferential speed GR of 4.1 m/min in the opposite (reverse) direction relative to the line speed LS direction in such a manner as to maintain a speed ratio LS/GR of −0.17. A gas diffusion layer coated with the coating liquid was heated for three minutes in a drying oven of the coating machine maintained at 100° C. to dry out the solvent, and baked in a muffle electric oven maintained at 350° C. for one hour to sinter, to obtain a gas diffusion layer 1 coated with the conductive fine particle layer. A coating amount of conductive fine particles (acetylene black) was approximately 22 g/m$^2$. The Gurley permeability of the gas diffusion layer 1 thus obtained was 26 seconds.

Example 2

(1) Preparation of Coating Liquid (Dispersion of Carbon Black and PTFE)

The same coating liquid as that of Example 1 except that the amount of pure water to be added when the PTFE dispersion was added was changed to 99 g was used as a coating liquid. The viscosities (25° C.) were 3.0 Pa·s (3 rpm) and 0.5 Pa·s (30 rpm).

(2) Coating of Conductive Fine Particle Layer

The carbon paper used as the substrate was identical to that used in Example 1.

A gas diffusion layer 2 was obtained under the same conditions including coating device and coating conditions as in Example 1 except that a gravure roll which had a diameter of 150 mm and a width of 280 mm and was formed as grid type 30 (mesh)-260 μm (depth) was used. As the coating liquid of a relatively low concentration (viscosity) was used in the coating, a small amount of the coating liquid seeped out to a surface different from the surface of the substrate to be coated. A coating amount of conductive fine particles was approximately 22 g/m$^2$. Also, the Gurley permeability of the gas diffusion layer 2 thus obtained was 4 seconds.

Example 3

(1) Preparation of Coating Liquid (Dispersion of Carbon Black and PTFE)

The same coating liquid as that of Example 1 was used as a coating liquid.

(2) Coating of Conductive Fine Particle Layer

The same carbon paper as that of Example 1 was used as a substrate.

A gas diffusion layer 3 was obtained using the same coating device and the same coating conditions as in Example 1, except that a blade pressure was manually increased and the coating was carried out so as give a coating amount of conductive fine particles of approximately 19 g/m$^2$.

Example 4

(1) Preparation of Coating Liquid (Dispersion of Carbon Black and PTFE)

The same coating liquid as that of Example 1 was used as a coating liquid.

(2) Coating of Conductive Fine Particle Layer

The same carbon paper as that of Example 1 was used as a substrate.

A gas diffusion layer 4 was obtained under the same conditions as in Example 2 except that a line speed LS of the substrate was set to be 0.7 m/min and the gravure roll was rotated at a circumferential speed GR of 3.5 m/min in the opposite (reverse) direction relative to the line speed LS direction in such a manner as to maintain a speed ratio LS/GR of −0.2. A coating amount of conductive fine particle layer was approximately 29 g/m$^2$.

Example 5

(1) Preparation of Coating Liquid (Dispersion of Carbon Black and PTFE)

The same coating liquid as that of Example 1 was used as a coating liquid.

(2) Coating of Conductive Fine Particle Layer

The same carbon paper as that of Example 1 was used as a substrate.

A gas diffusion layer 5 was obtained under the same conditions as in Example 2 except that a line speed LS of the substrate was set to be 0.7 m/min and the gravure roll was rotated at a circumferential speed GR of 3.2 m/min in the opposite (reverse) direction relative to the line speed LS direction in such a manner as to maintain a speed ratio LS/GR of −0.22. A coating amount of conductive fine particle layer was approximately 27 g/m$^2$.

Comparative Example 1

(1) Preparation of Coating Liquid (Dispersion of Carbon Black and PTFE)

The same materials for a coating liquid as those of Example 1 were used. A 500 mL beaker was charged with 45 g of acetylene black, 3 g of the surfactant, and 232 g of pure water. The resultant mixture was stirred at a rotating speed of 80-100 rpm for 30 minutes using a propeller type stirrer (Three-One Motor BL300, produced by HEIDON) equipped with two stirring wings (soft cross) to perform pre-mixing. Then, the mixture was stirred at a rotating speed of 2000-3000 rpm for 2 hours using a homogenizer (T.K. Robomix Model F, produced by Tokushu Kika Kogyo, K.K.). After confirming that the acetylene black and the surfactant became in a paste-like state and sufficiently dispersed therein, 20 g of PTFE dispersion was added and the mixture was stirred at a rotating speed of 100 rpm for one hour, to obtain a coating liquid. The resultant coating liquid was defoamed under reduced pressure prior to coating. The viscosities (25° C.) were 10.7 Pa·s (3 rpm) and 1.2 Pa·s (30 rpm).

(2) Coating of Conductive Fine Particle Layer

The carbon paper used as the substrate was identical to that used in Example 1.

The coating of conductive fine particle layer was done manually using Baker type applicator. During the coating, a large amount of the coating liquid seeped out to a surface different from the surface of the substrate to be coated. After the coating, the coating was sintered for one hour in a muffle electric furnace maintained at 350° C., to obtain a comparative gas diffusion layer 1 coated with conductive fine particle layer. A coating amount of conductive fine particles was approximately 22 g/m$^2$.

Comparative Example 2

(1) Preparation of Coating Liquid (Dispersion of Carbon Black and PTFE)

The same coating liquid as that of Example 1 was used as a coating liquid.

(2) Coating of Conductive Fine Particle Layer

The same carbon paper as that of Example 1 was used as a substrate.

A comparative gas diffusion layer 2 was obtained under the same conditions as in Example 1 except that a line speed LS of the substrate was set to be 0.7 m/min and the gravure roll was rotated at a circumferential speed GR of 0.7 m/min in the forward direction relative to the line speed LS direction in such a manner as to maintain a speed ratio LS/GR of 1.0. Despite the attempt of a coating test, the attempt failed as the gravure roll was unable to pick up a sufficient amount of the coating liquid having a high viscosity under the given conditions, causing omission or shortage of the coating material, thus exposing the surface of the substrate and making the formation of a conductive fine particle layer impossible. A coating amount of conductive fine particles was approximately 4 g/m$^2$.

Comparative Example 3

(1) Preparation of Coating Liquid (Dispersion of Carbon Black and PTFE)

The same coating liquid as that of Example 1 was used as a coating liquid.

(2) Coating of Conductive Fine Particle Layer

The same carbon paper as that of Example 1 was used as a substrate.

A comparative gas diffusion layer 3 was obtained under the same conditions as in Example 1 except that a line speed LS of the substrate was set to be 0.7 m/min and the gravure roll was rotated at a circumferential speed GR of 0.7 m/min in the opposite (reverse) direction relative to the line speed LS direction in such a manner as to maintain a speed ratio LS/GR of −1.0. Despite the attempt of a coating test, the attempt ended up in a result approximately similar to Comparative Example 2, and it failed in forming a conductive fine particle layer. A coating amount of conductive fine particles was approximately 6 g/m$^2$.

Comparative Example 4

(1) Preparation Of Coating Liquid (Dispersion of Carbon Black and PTFE)

The same coating liquid as that of Example 1 except that the amount of pure water to be added when the PTFE dispersion was added was changed to 219 g was used as a coating liquid. The viscosities (25° C.) were 1.0 Pa·s (3 rpm) and 0.2 Pa·s (30 rpm).

(2) Coating of Conductive Fine Particle Layer

The carbon paper used as the substrate was identical to that used in Example 1.

A 4 gas diffusion layer 2 was obtained under the same conditions including coating device and coating conditions as in Example 1 except that a gravure roll which had a diameter of 150 mm and a width of 280 mm and was formed as grid type 17 (mesh)-430 (depth) was used. Despite the attempt of a coating test, a large amount of the coating liquid seeped out to a surface different from the surface of the substrate to be coated, to create many streaks of ridges, at the bottom of which the substrate surface was exposed, thus making the formation of a conductive fine particle layer impossible. A coating amount of conductive fine particles was approximately 17 g/m$^2$.

Comparative Example 5

(1) Preparation of Coating Liquid (Dispersion of Carbon Black and PTFE)

The same coating liquid as that of Example 1 except that the amount of pure water to be added when the PTFE dispersion was added was changed to 39 g was used as a coating liquid. The viscosities (25° C.) were 6.7 Pa·s (3 rpm) and 1.4 Pa·s (30 rpm).

(2) Coating of Conductive Fine Particle Layer

The carbon paper used as the substrate was identical to that used in Example 1.

The same coating device as used in Example 1 was used. A direct type gravure method was used wherein a gravure roll was used as a coating roll and pressure cylinder rolls were installed on a transfer area of the coating liquid. The gravure roll had a diameter of 150 mm and a width of 280 mm, and was formed as grid type 17 (mesh)-430 (depth). A line speed LS of the substrate was set to be 0.7 m/min and the gravure roll was rotated at a circumferential speed GR of 0.7 m/min in the forward direction relative to the line speed LS direction in such a manner as to maintain a speed ratio LS/GR of 1.0. A comparative gas diffusion layer 5 was obtained by conducting the test keeping all other conditions similar to those in Example 1. The coating surface thus obtained had poor smoothness as the undulations of the gravure pattern are copied thereonto and lack of paints occurred at various portions of the coating surface that correspond to the gravure protrusions, exposing the substrate surface, so that it failed in forming a coating of conductive fine particle layer. A coating amount of conductive fine particles (acetylene black) was approximately 16 g/m$^2$.

[Evaluation of Power Generation]

A membrane electrode assembly was prepared according to the following procedures using each gas diffusion layer prepared in Examples 1 to 5 and Comparative Example 1. Power generation of each membrane electrode assembly was measured, to evaluate the gas diffusion layer.

(1) Preparation of Catalyst Layer

Platinum-supported carbon (TEC10E50E, produced by Tanaka Kikinzoku Kogyo, K.K.; platinum content: 50% by mass), solid polyelectrolyte solution (Nafion solution DE520, produced by Dupont, electrolyte content: 5% by mass), pure water, and isopropyl alcohol were incorporated in a mass ratio of 1:1:5:5 in a glass container placed in a water bath maintained at 25° C., and mixed and dispersed for one hour using a homogenizer, to prepare a catalytic ink.

Next, the catalytic ink was coated on one side of a Teflon sheet using a screen printer, dried for six hours in an atmosphere at 25° C., to form a catalyst layer (platinum mass 0.4 mg/cm$^2$) on the Teflon sheet.

(2) Production of Electrode Membrane Assembly and Single-Cell

Two catalyst layers prepared in the above are placed on both sides of a solid polymer electrolyte membrane (Nafion 211 (registered trademark)), hot-pressed at 130° C. and 2 MPa for 10 minutes according to a hot press method. Then, the Teflon sheet was peeled off, to produce a membrane electrode assembly.

The membrane electrode assembly thus obtained was sandwiched with two gas diffusion layers prepared as mentioned above in such a way as to have the substrate layers on the outside, which was further sandwiched with graphite separators, and finally sandwiched with gold-plated stainless steel current collectors, to produce a single cell for evaluation.

(3) Evaluation of Single Cell

Power generation test was conducted on each single cell for evaluation obtained in Examples 1 to 5 and Comparative example 1.

First, for evaluation under a humid condition, the power generating test was conducted by supplying hydrogen to the anode and air to the cathode with a gas flow of anode/cathode S.R.=1.25/1.43 at relative humidity of 100% R.H. at anode/100% R.H. at cathode, and at a cell temperature of 50° C. The term "S R." (stoichiometric ratio) as used herein means a ratio of hydrogen or oxygen required for generating a specified electric current, and the term "anode S.R.=1.25" means that hydrogen is supplied in an amount of 1.25 times of hydrogen amount required for generating the specified electric current.

Figure 3:
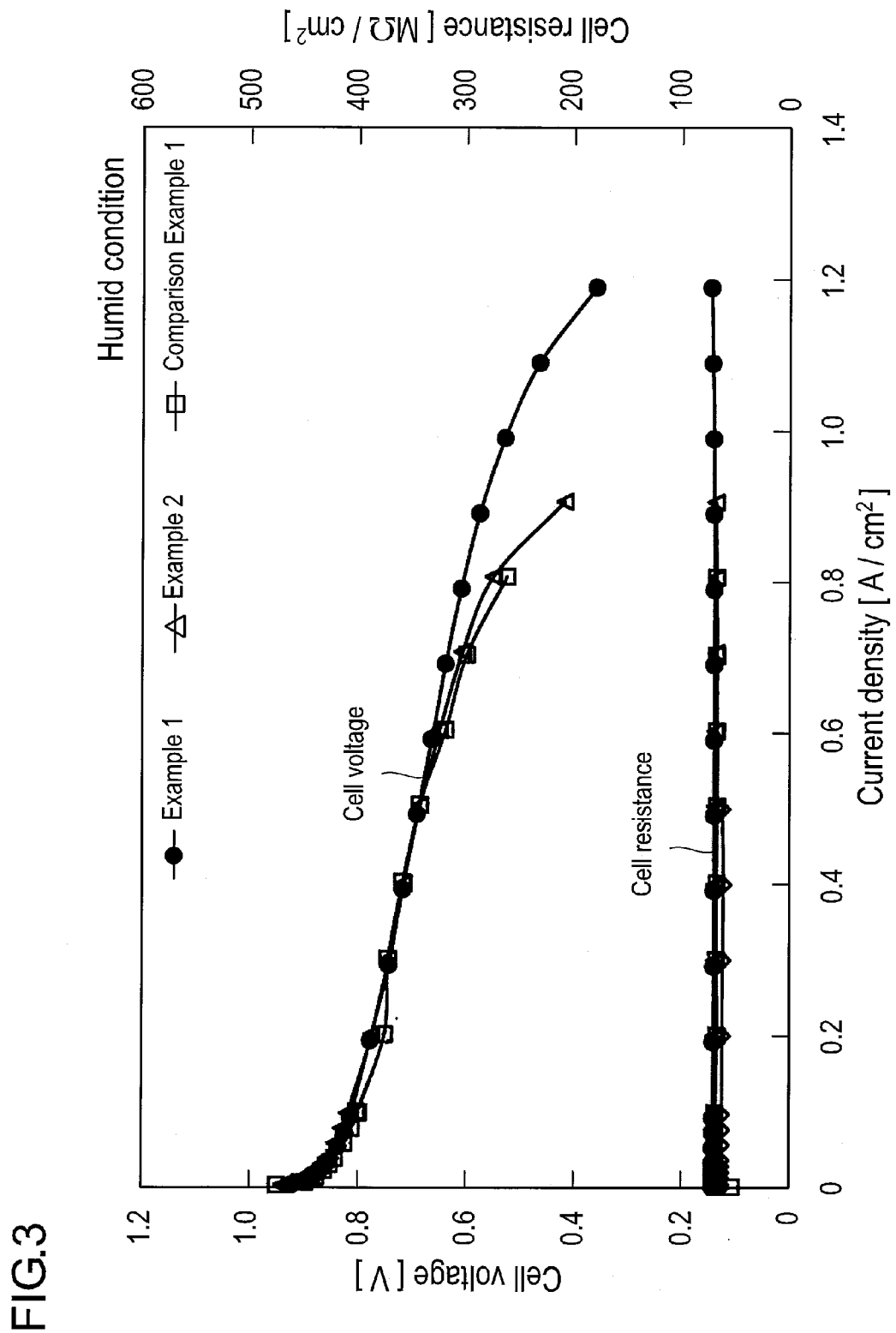
FIG. 3 is a graph showing an example of power generating evaluation under wet conditions.

FIG. 3 shows an example of power generating evaluation results under moistness condition. As shown in FIG. 3, the cells using the gas diffusion layers of Examples 1 and 2 showed high voltages even at high current densities, proving good performances.

On the other hand, the cell using the gas diffusion layer of Comparative Example 1 showed a tendency of voltage drops at high current densities. The cell using the gas diffusion layer of Comparative Example 1 was prepared by using a relatively low coating liquid concentration (viscosity) and manual coating step (i.e., after-measuring method) using a Baker type applicator. Accordingly, the conductive fine particle layer was excessively penetrated into the substrate layer, thus failing to produce large holes in the conductive fine particle layer, to result in poor water drainage efficiency.

Next, for evaluation under a dry condition, the power generating test was conducted by supplying hydrogen to the anode and oxygen to the cathode with a gas flow of anode/cathode S.R.=1.5/2.5 at relative humidity of 20% R.H. at anode/20% R.H. at cathode, and at a cell temperature of 70° C.

Figure 4:
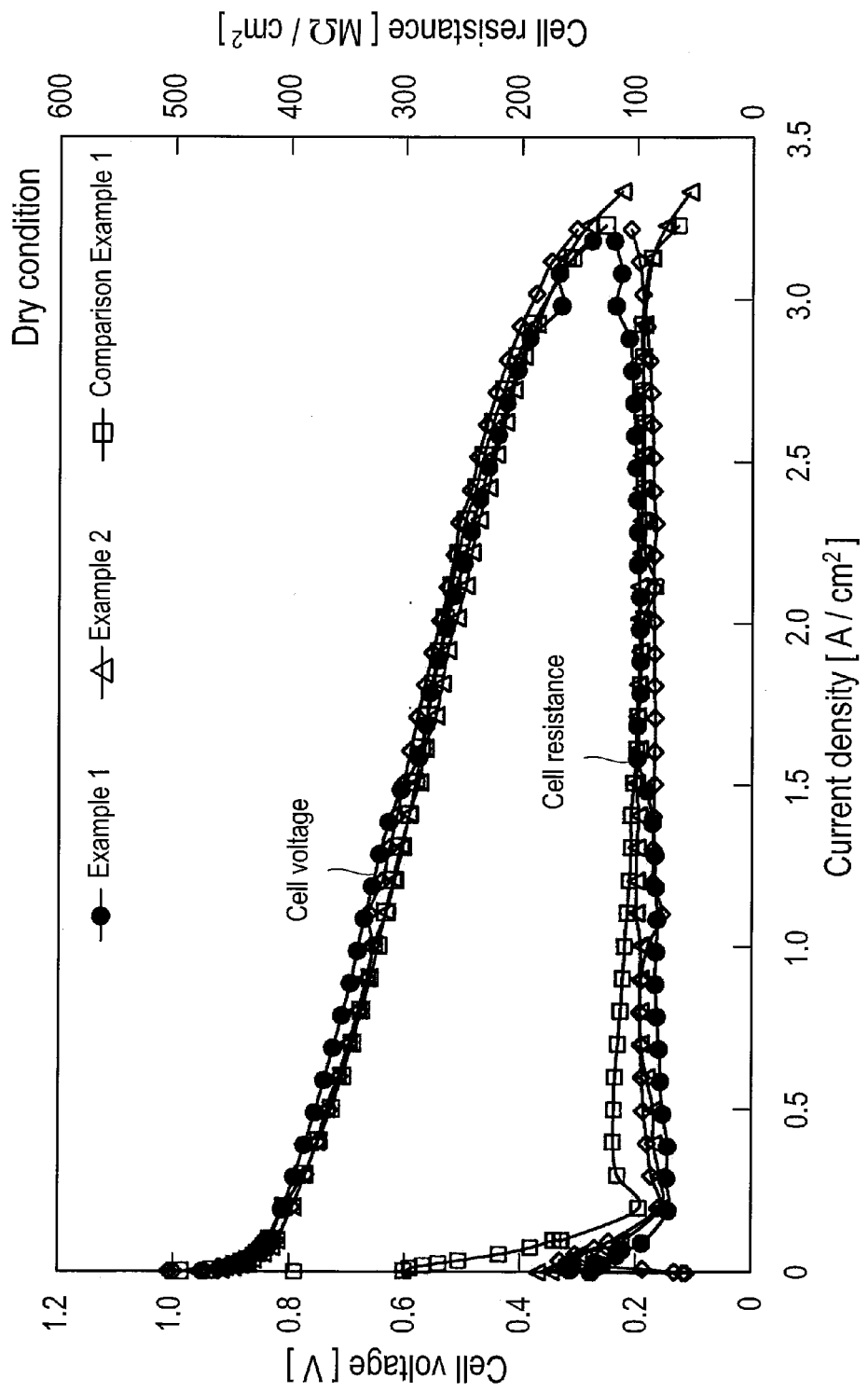
FIG. 4 is a graph showing an example of power generating evaluation under dry conditions.

FIG. 4 shows an example of power generating evaluation results under dry condition. As shown in FIG. 4, approximately equal performances were obtained for the cells using the gas diffusion layers of Examples 1 and 2 as well as Comparative Example 1.

It can be noted from FIG. 3 and FIG. 4 that the cells using the gas diffusion layers of Examples 1 and 2 were able to improve anti-flooding properties without affecting anti-dryout properties. From this result, it can be observed that the cell using the gas diffusion layer of the present invention excels in both anti-dry-out properties and in anti-flooding properties, achieving both characteristics simultaneously, so that it can be suitably responded to load changes.

Based on the above, the results of coating tests and power generating evaluations of the Examples and Comparative Example are summarized in Table 1.

100 Coating device
110 Tank
111 Coating liquid
120 Gravure roll
131 Pressure roll
132 Pressure roll
140 Doctor blade

TABLE 1

|  |  | Coating method[1] | LS/GR ratio [-] | Viscosity [Pa·s] 3 rpm | Viscosity [Pa·s] 30 rpm | G Roll diameter [mm] | Conductive fine particle agent Coating amount [g] | Coating quality Front[2] | Coating quality Back[3] | Limiting current density [A/cm²] Dry condition | Limiting current density [A/cm²] Humid condition |
|---|---|---|---|---|---|---|---|---|---|---|---|
| Example | 1 | K.G | −0.17 | 18.8 | 2.8 | 150 | 22 | ○ | ○ | 3.2 | 1.2 |
|  | 2 | ↑ | ↑ | 3.0 | 0.5 | ↑ | ↑ | ○ | Δ | 3.3 | 0.9 |
|  | 3 | ↑ | ↑ | 18.8 | 2.8 | ↑ | 19 | ○ | ○ | 3.6 | 1.1 |
|  | 4 | ↑ | −0.20 | ↑ | ↑ | ↑ | 29 | ○ | ○ | 3.4 | 1.1 |
|  | 5 | ↑ | −0.22 | ↑ | ↑ | ↑ | 27 | ○ | ○ | 3.5 | 1.2 |
| Comparison | 1 | B.A |  | 10.7 | 1.2 |  | 22 | ○ | x | 3.2 | 0.8 |
| Example | 2 | K.G | 1.00 | 18.8 | 2.8 | 150 | 4 | x | ○ | NA | NA |
|  | 3 | ↑ | −1.00 | ↑ | ↑ | ↑ | 6 | x | ○ | ↑ | ↑ |
|  | 4 | ↑ | −0.17 | 1.0 | 0.2 | ↑ | 17 | x | x | ↑ | ↑ |
|  | 5 | D.G | 1.00 | 6.7 | 1.4 | 150 | 16 | x | ○ | ↑ | ↑ |

[1]Coating method, K.G; kiss gravure, B.A; Baker type applicator (manual), D.G; direct gravure
[2]Front (surface to be coated) ○; good, x: failed to form a conductive fine particle layer due to omission or shortage of coating liquid
[3]Back (surface different from coating surface) ○; good, Δ; small seepage of coating liquid, x: large seepage of coating liquid It was noted that by the manufacturing method according to the embodiment of the present invention, a gas diffusion layer for a fuel cell wherein a coating surface of conductive fine particle layer is smooth and does not allow a substrate surface to expose, and the penetration of conductive fine particle layer into the substrate layer can be controlled can be produced, that a fuel cell using the gas diffusion layer can provide satisfactory anti-flooding and anti-dry-out properties at the same time even at high current densities, and maintain high voltage particularly at humid conditions as well, to manifest better performances as compared to a cell using a conventional gas diffusing layer.

As such, by coating a specific conductive fine particle layer inside of or on the surface of a gas diffusion layer, a gas diffusion layer with excellent load change adaptability having anti-flooding properties higher than a conventional one for the same anti-dry-out properties can be produced.

The entire disclosure of Japanese Patent Application No. 2009-209734 filed on Sep. 10, 2009 including specification, claims, drawings and summary are incorporated herein by reference in its entirety.

DESCRIPTION OF CODES

10 Polymer electrolyte fuel cell
21 Solid polymer electrolyte membrane
31 Anode catalyst layer
32 Cathode catalyst layer
41 Anode gas dispersion layer
42 Cathode gas dispersion layer
43 Substrate layer
44 Conductive fine particle layer
45 Substrate
51 Anode separator
51a Supply groove
52 Cathode separator
52a Supply groove
LS Line speed for conveying substrate
GR Circumferential speed of gravure roll
η Apparent viscosity of coating liquid according to Type B viscosimeter

The invention claimed is:

1. A method for manufacturing a gas diffusion layer for fuel cells containing a substrate layer and a conductive fine particle layer,
which method comprises a coating step of applying a coating liquid for forming said conductive fine particle layer on at least one surface of a substrate for forming said substrate layer by a kiss coating using a gravure roll, wherein in said coating step, a speed difference is generated between a line speed LS [m/min] of transferring the substrate and a circumferential speed GR [m/min] of the gravure roll (LS≠GR), and apparent viscosity [η(Pa·s)] of the coating liquid as determined by type B viscosimeter satisfies the following relations:

$$1.0 < \eta < 200.0 \ (3 \text{ rpm})$$

$$0.2 < \eta < 10.0 \ (30 \text{ rpm}).$$

2. The method for manufacturing the gas diffusion layer according to claim 1, wherein said viscosity [η(Pa·s)] satisfies the following relations:

$$2.0 \leq \eta \leq 100.0 \ (3 \text{ rpm})$$

$$0.3 \leq \eta \leq 9.0 \ (30 \text{ rpm}).$$

3. The method for manufacturing the gas diffusion layer for fuel cells according to claim 1, wherein a ratio (LS/GR) of the circumferential speed GR [m/min] of the gravure roll and the line speed LS [m/min] is higher than −0.8 and less than 0.8 (−0.8<LS/GR<0.8; except that LS/GR≠0).

4. The method for manufacturing the gas diffusion layer for fuel cells according to claim 1, wherein an outer diameter of said gravure roll is not less than 60 mm.

5. The method for manufacturing the gas diffusion layer for fuel cells according to claim 1, wherein conductive fine particles are dispersed in the coating liquid with a concentration of not less than 10 wt % but not more than 90 wt %.

6. The method for manufacturing the gas diffusion layer for fuel cells according to claim 1, wherein said coating liquid consists of carbon particles as the conductive fine particles, a binder, a surfactant, and a solvent.

7. The method for manufacturing the gas diffusion layer for fuel cells according to claim 6 wherein said coating liquid is prepared by stirring the carbon particles as the conductive fine particle, the surfactant, and the solvent at a rotating speed of 80-200 rpm, and adding the binder thereto.

8. The method for manufacturing the gas diffusion layer for fuel cells according to claim 2, wherein a ratio (LS/GR) of the circumferential speed GR [m/min] of the gravure roll and the line speed LS [m/min] is higher than −0.8 and less than 0.8 (−0.8<LS/GR<0.8; except that LS/GR≠0).

* * * * *